July 11, 1933.   E. S. MacPHERSON   1,917,894
CHASSIS FRAME CONSTRUCTION
Filed May 25, 1931
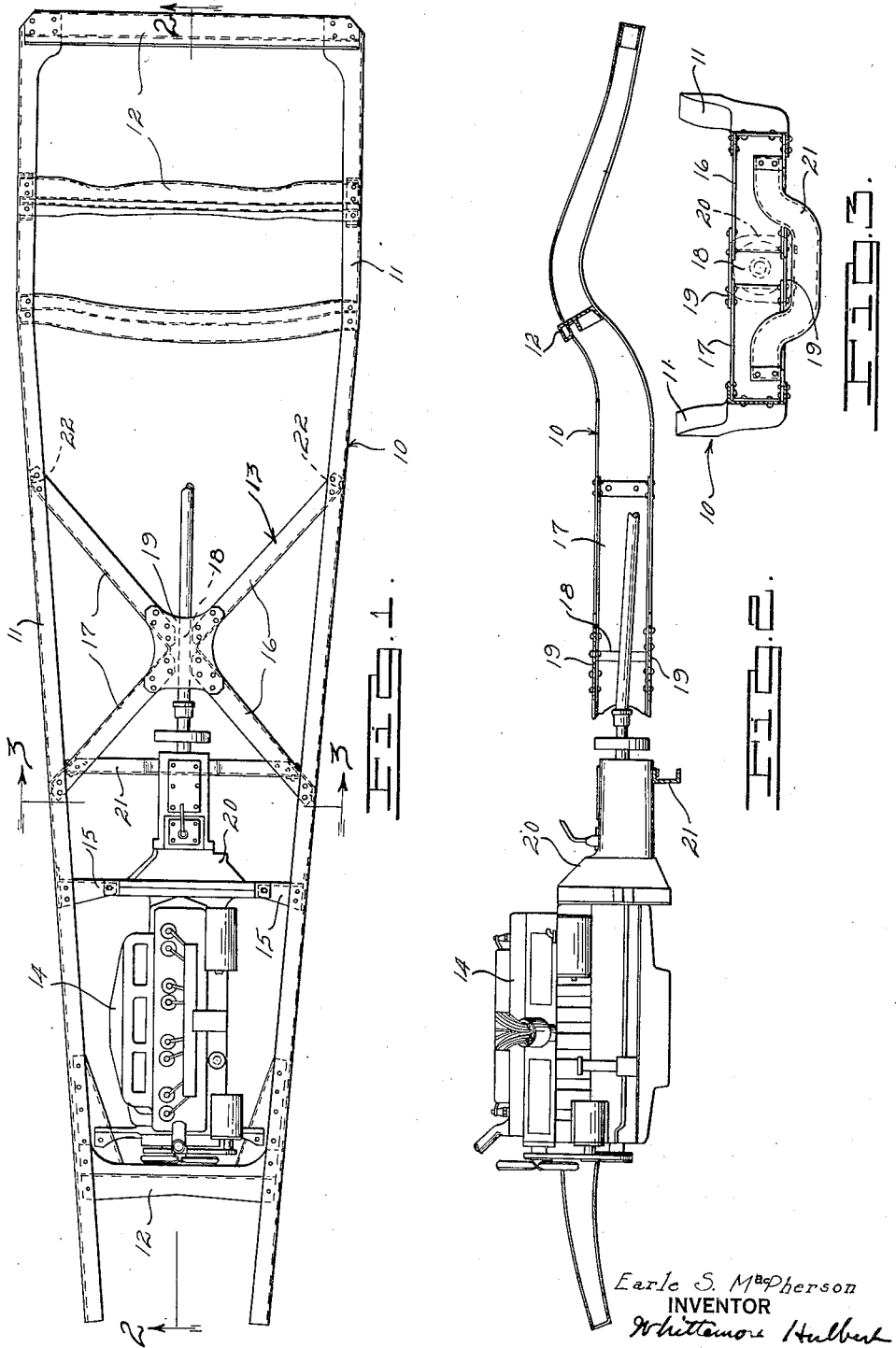
Earle S. MacPherson
INVENTOR
Whittemore Hulbert
BY Whittemore & Belknap
ATTORNEY Patented July 11, 1933

1,917,894

UNITED STATES PATENT OFFICE

EARLE S. MacPHERSON, OF DETROIT, MICHIGAN, ASSIGNOR TO HUPP MOTOR CAR CORPORATION, OF DETROIT, MICHIGAN, A CORPORATION OF VIRGINIA

CHASSIS FRAME CONSTRUCTION

Application filed May 25, 1931. Serial No. 539,938.

This invention relates generally to vehicle chassis frame constructions and more particularly to improved means for supporting a power plant upon the vehicle frame.

In the manufacture of vehicles as now commercially produced, the forward end portions of the chassis frames are relied upon to support a substantially greater percentage of the sprung weight of the vehicle than the rear portions of the frame. In other words, the power plant of the conventional vehicle is carried directly by the forward portions of the frame while the rear portions of the frame merely support the sprung weight of the body which usually is considerably less than the weight of the power plant. The above construction results in an uneven distribution of the sprung weight of the vehicle upon the chassis frame which is objectionable since it not only detrimentally affects the riding qualities of the vehicle, but also necessitates fashioning the frame of relatively heavy gage material of sufficient strength to adequately carry the localized weight of the load.

The present invention contemplates eliminating the foregoing objections by providing means for supporting power plants upon vehicle chassis frames in such a manner that the weight of the power plant is more evenly distributed over substantially the entire length of the frame without changing or otherwise interfering with the usual position assumed by the power plant in present day production of vehicles. The advantages derived by effecting an even distribution of load upon the chassis frame are numerous and include: first, permitting a reduction in the gage of material utilized in fashioning the frame while maintaining the same sufficiently rigid to adequately support the load with the result that a lighter and cheaper frame is provided, and second, permitting the sprung weight of the chassis to be more evenly distributed upon the front and rear suspension means, thereby enhancing the riding qualities of the vehicle.

The foregoing as well as other objects will be made more apparent as this description proceeds, especially when considered in connection with the accompanying drawing, wherein:

Figure 1 is a fragmentary plan view of a vehicle chassis frame constructed in accordance with this invention;

Figure 2 is a sectional view taken on the line 2—2 of Figure 1;

Figure 3 is a sectional view taken on the line 3—3 of Figure 1.

Referring now to the drawing, it will be noted that there is fragmentarily illustrated in Figure 1 a chassis frame 10 comprising side sills 11 substantially channel-shaped in cross section and held in proper spaced relation to each other by means of a plurality of cross-braces 12. Positioned at the forward end of the chassis frame is a power unit 14 having the forward end thereof supported in the conventional manner upon the front cross member 12 and secured to the sills 11 intermediate the ends thereof by means of the laterally extending motor arms 15 as clearly shown in Figure 1.

Located in rear of the power unit is an X-shaped bracing element 13 so constructed and secured to the sills as to resist torsional strains imparted to the frame or in other words, functions to prevent twisting movements of the sills 11 relative to each other. In detail, the brace 13 comprises a pair of substantially V-shaped members 16 and 17 channel-shaped in cross section and having the free ends thereof suitably secured to the opposite side sills 11 at longitudinally spaced points. The central portions or apexes 18 of the members are arranged upon opposite sides of the median longitudinal axis of the frame so as to provide sufficient clearance therebetween for the passage of the propeller shaft of the power plant and are rigidly secured together by plates 19 secured to the top and bottom flanges of the members as shown in Figure 2. It is believed obvious from the previous description of the bracing member 13 and from the manner in which the same is secured to the side sills of the frame that the same will effectively brace the latter to prevent twisting of the sills relative to each other as hereinbefore stated.

In the previous description it has been pointed out that the forward end of the power plant 14 is supported by the front cross brace 12 of the frame and the intermediate portions of the power plant are supported by the sills through the motor arms 15. In a great many motor vehicles as now commercially produced, the foregoing constitutes the sole means for supporting the power plant upon the frame with the result that substantially the entire weight of the power unit is localized at the forward end portion of the frame resulting in an uneven distribution of the normal load since the weight supported by the rear portions of the chassis frame is usually comparatively light.

In order to effect a more uniform distribution of the weight of the power unit upon the chassis frame, I provide a support 21 for the rear end of the power unit. The support 21 may be of any desirable construction and preferably extends transversely of the chassis frame between the sill members 11 and has the central portion thereof suitably connected to the rear end of the power unit. The free ends of the member 21 are rigidly secured to the forward legs of the V-shaped members 16 and 17 at points spaced from the connection of the latter members to the frame. Thus, it will be seen that the rear motor support 21 is not secured directly to the sills of the frame, but, on the other hand, is carried by and secured to the torsional brace 13 in such a manner that a certain percentage of the weight of the power unit is distributed to the sill members at the points of connection of the X frame with the sill members. In other words, by securing the ends of the motor support to the forward legs of the X member 13, a certain percentage of the weight thereof is transmitted to the rear legs of the V-shaped members and from the latter to the frame at the points indicated by the reference character 22 which are spaced a substantial distance rearwardly from the points of connection between the forward legs of the X brace as shown in Figure 1.

Thus, from the foregoing, it is believed obvious that I have provided a novel arrangement which provides for distributing the sprung weight on the chassis more uniformly over substantially the entire length of the same and that I have accomplished the above result in an extremely simple and economical manner without changing or otherwise interfering with the construction and relative positions of the standard parts of the power unit.

While in describing the present invention particular stress has been placed upon the use of my improved supporting means in connection with a rear drive vehicle, it should be understood that the same may be used and applied with equal facility upon a front drive vehicle and accordingly, the invention contemplates such an arrangement.

What I claim as my invention is:

1. A vehicle chassis having in combination, a frame provided with laterally spaced side sills extending longitudinally of the vehicle, a power unit adjacent the forward end portions of the frame, frame members having the forward ends secured to the frame adjacent the rear end of said power unit and having the rear ends secured to the sills at points spaced a substantial distance rearwardly from the power unit, and means secured to the frame members intermediate the ends thereof and attached to the power unit for supporting the latter on the frame.

2. A vehicle chassis having in combination, a frame provided with laterally spaced side sills extending longitudinally of the vehicle, a power unit adjacent the forward end portions of the frame, frame members positioned in rear of the power unit upon opposite sides of the longitudinal median line of the frame, said members having their forward ends secured to the sills adjacent the rear end of the power unit and having their rear ends secured to the sills adjacent the rear ends of the latter at points spaced a substantial distance rearwardly from the power unit, a cross member having the opposite ends thereof secured to the members aforesaid intermediate the ends thereof, and means for attaching the rear end of the power unit to said cross member.

3. A vehicle chassis having in combination, a frame provided with laterally spaced side sills extending longitudinally of the vehicle, a power unit adjacent the forward end portions of the frame, frame members positioned in rear of the power unit upon opposite sides of the longitudinal median line of the frame, said members having their forward ends rigidly secured to the sills adjacent the rear end portions of the power unit and having their rear ends secured to the sills adjacent the rear end portions of the latter at points spaced a substantial distance rearwardly from the power unit, means for connecting said frame members to form a structural brace for the chassis frame, and means for supporting the power unit upon the frame members intermediate the ends thereof.

4. A vehicle chassis having in combination, a frame provided with laterally spaced side sills extending longitudinally of the vehicle, a power unit adjacent the forward end portions of the frame, a substantially V-shaped frame member associated with each sill member in rear of the power unit and having their free ends rigidly secured to the sill members at longitudinally spaced points, means for connecting the apexes of said V-shaped members together to form a torsional brace for the frame, and means for supporting the rear end portion of the power unit upon the forward legs of the V-shaped members.

5. A vehicle chassis having in combination, a frame provided with laterally spaced side sills extending longitudinally of the vehicle, a power unit adjacent the forward end portions of the frame, a frame member associated with each sill and positioned substantially in rear of the power unit, said frame members having portions intermediate the ends thereof extending inwardly from the sills toward each other and having the ends rigidly secured to the sills at longitudinally spaced points, a member extending transversely of the frame having the opposite ends rigidly secured to said frame members intermediate the ends thereof and having portions secured to the rear end of the power unit for supporting the latter.

6. A vehicle chassis having in combination, a frame provided with laterally spaced side sills extending longitudinally of the vehicle, a power unit adjacent the forward end portions of the frame, a torsional brace for the frame having portions extending diagonally of the latter and secured to the sills at longitudinally spaced points, and means for supporting the rear end of the power unit upon the diagonal portions of the brace.

7. A vehicle chassis having in combination, a frame provided with laterally spaced side sills extending longitudinally of the vehicle, a power unit adjacent the forward end portions of the frame, a substantially X-shaped brace extending between the sills substantially in rear of the power unit and having the free ends rigidly secured to the sills, and means for supporting the rear end portions of the power unit upon said brace.

8. A vehicle chassis having in combination, a frame provided with laterally spaced side sills extending longitudinally of the vehicle, a power unit adjacent the forward end portions of the frame, a substantially X-shaped torsional brace arranged between the sills substantially in rear of the power unit and having the free ends thereof rigidly secured to the sills, and means for supporting the rear end portions of the power unit upon the forwardly extending legs of the brace.

9. A vehicle chassis having in combination a frame provided with laterally spaced side sills extending longitudinally of the chassis, a power unit carried by the frame, a frame member positioned on each side of the longitudinal median line of the chassis frame and having the opposite end portions rigidly secured to said sills, and a cross member connecting said frame members intermediate the ends thereof and forming a support for the power unit.

In testimony whereof I affix my signature.

EARLE S. MacPHERSON.